United States Patent [19]

Moenne-Loccoz

[11] Patent Number: 5,933,848

[45] Date of Patent: *Aug. 3, 1999

[54] SYSTEM FOR MANAGING THE CACHING OF DATA OF A MASS STORAGE WITHIN A PORTION OF A SYSTEM MEMORY

[75] Inventor: Philippe Moenne-Loccoz, Chapitre Grenoble, France

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/735,056

[22] Filed: Nov. 8, 1996

[30] Foreign Application Priority Data

Dec. 1, 1995 [EP] European Pat. Off. .............. 95410138

[51] Int. Cl.$^6$ ...................................................... G06F 12/08
[52] U.S. Cl. ........................................... 711/113; 711/118
[58] Field of Search ........................... 711/111, 112, 113, 711/117, 118, 154; 395/842; 710/22

[56] References Cited

U.S. PATENT DOCUMENTS

| | | | |
|---|---|---|---|
| 5,289,581 | 2/1994 | Berenguel et al. ...................... | 711/113 |
| 5,420,984 | 5/1995 | Good et al. .............................. | 395/842 |
| 5,423,015 | 6/1995 | Chung ..................................... | 711/108 |
| 5,649,156 | 7/1997 | Vishlitsky et al. ...................... | 711/136 |

FOREIGN PATENT DOCUMENTS

91/03788  3/1991  WIPO .

OTHER PUBLICATIONS

Patent Abstracts of Japan, JP1281545, vol. 14, No. 54, Izumida Naoki et al., "Cache Memory Control System", Nov. 13, 1989.

European Search Report, EP 95 41 0138, May 8, 1996.

International Search Report, PCT/US90/04711, Nov. 30, 1990.

*Primary Examiner*—Eddie P. Chan
*Assistant Examiner*—Gary J. Portka

[57] ABSTRACT

Computers are frequently provided with cache systems to facilitate processor access to data, such systems serving to temporarily store selected data blocks read from a mass storage subsystem. In the present cache system, a portion (19) of system memory (11) is organized as cache memory, and a cache manager (30) is provided that exists separately of the processor (10) and system memory (11). Thus, in one embodiment the cache manager (30) interfaces with a peripheral bus (15) to which the mass storage subsystem (16, 17) is also connected. When the computer operating system (18) wishes to read a particular data block, it issues a request over the computer bus system to the cache manager (30) which, if the block is currently held in the cache (19), returns the cache address of that block. If the requested block is not in the cache, the cache manager (30) initiates the transfer of the block from the mass storage peripheral (16, 17) to the cache memory (19). The actual data block transfer may be performed under the control of the operating system (18) or, if the mass storage subsystem (16, 17) is DMA capable, by the mass storage subsystem itself.

6 Claims, 4 Drawing Sheets

SYSTEM FOR MANAGING THE CACHING OF DATA OF A MASS STORAGE WITHIN A PORTION OF A SYSTEM MEMORY

FIELD OF THE INVENTION

The present invention relates to a cache system for a computer.

BACKGROUND OF THE INVENTION

It is well known to provide a cache externally of the processor unit of a computer in order to improve the system performance by reducing the effective access time to data stored by mass-storage peripherals (typically hard disks).

The basic idea of cache is to store part of the data of a mass-storage device in a much faster memory (cache memory). If the needed data is already in the cache (cache 'hit') then the access time will be reduced resulting in a boost to system performance. If the data is not in the cache memory (cache 'miss') then there is no improvement at this time but the cache memory is updated with the new data so that is the next time the data is requested a cache 'hit' will result.

By way of example, consider the case of a computer having a 512 megabyte mass storage device with the access time for one data block (1K bytes) of 10 ms, and a 4 megabyte cache memory with an access time for one data block of 10 microsecond. If the requested data is always in the cache memory (cache hit rate=100%) the access performance will be boosted by a factor 1000 by the cache memory. More realistically, the cache hit rate will be around 50% in which case performance will be boosted by a factor of 2.

Whilst this example shows clearly the benefit of a cache sub-system, the degree of this benefit is very difficult to estimate as it depends on a lot of parameters:

1- operating-system,
2- software applications,
3- file allocation on the mass-storage disk,
4- size and architecture of the cache,
5- bandwith of the different buses,
6- overhead due to cache management.

In general terms, parameters 1 to 4 determine the cache hit rate whereas paramaters 5 and 6 determine the cache efficiency at a given hit rate.

Other types of caching are also used to improve system performance such as internal processor caches; however, the present invention is concerned with cache sub-systems external to the processor unit. Two known forms of external cache system will now be briefly described with reference to FIGS. 1 and 2 of the accompanying drawings.

FIG. 1 illustrates a known computer system comprising a system processor 10 with working or system memory 11 from which the processor 10 executes programs including its operating system 18. The processor 10 is connected to the system memory 11 over a processor local bus 12 and a memory bus 13, these buses being interconnected through an inter-bus interface 14. A peripheral bus 15 is also connected to the interface 14 in a manner enabling its communication with both other buses. A mass storage peripheral device 16 is connected to the peripheral bus 15 via a peripheral controller 17.

In the FIG. 1 system, a software-based cache sub-system is provided. More particularly, a portion 19 of the system memory 11 is used as cache memory and cache manager software 20 permanently loaded into system memory is used to control and manage the cache memory. The size of the cache memory 11 can be changed without any hardware modification and, indeed, cache size can be changed dynamically.

The cache manager software is called by the operating system 18 whenever the latter wishes to read or write a block of data, and it is the processor 10 that actually executes the cache manager software 20. The basic operation of the FIG. 1 cache sub-system is as follows:

a) Read access:
 The operating system 18 sends a request to the cache manager software 20 indicating that it wishes to read one block of data. The cache manager 20 then checks if the requested block is in the cache memory 19:
  if no, (read miss) the request is propagated to the peripheral controller 17 which returns the requested block from the mass storage peripheral 16 to the cache memory. The cache manager 20 then copies the data block to a location in system memory specified by the operating system.
  if yes (read hit) the request is not transmitted to the peripheral controller 17; instead the cache manager 20 copies the data block from cache memory 19 to the specified location in system memory.

b) Write access:
 The operating system 18 sends a request to the cache manager 20 indicating that it wishes to write one block of data. The cache manager 20 then checks if the requested block is in the cache memory 19:
  if no, (write miss) the request is propagated to the peripheral controller 17 and the data block is thereafter transferred to the mass storage peripheral 16.
  if yes, (write hit) the request is not transmitted to the peripheral controller 17; instead the data block in the cache memory 19 is updated.

Thus, data flow is either from system memory to system memory in case of a cache hit, or between the peripheral and system memory in case of a cache miss. As the system memory bus often has the highest bandwidth, cache hit transfers have the best performance. Note that if peripheral controller 17 has a DMA (MASTER) capability, then the transfer between the peripheral and system memory can be done by the controller thereby relieving the processor of this task; however the processor still performs the cache management.

Advantages of the FIG. 1 caching arrangement are that it has no hardware impact on the system, it is a cost free solution (no added hardware), the cache size is flexible, and the software cache manager is generally provided with the operating system. Disadvantages include the fact that using software to carry out cache management has a performance impact; indeed, some cache architectures that provide the best hit rate (for example, full associative cache with a great number of cache entries) may introduce unacceptable management overhead.

FIG. 2 shows another known cache arrangement as applied to the same computer system as FIG. 1. In the FIG. 2 arrangement, the cache management is not performed by the system processor 10 but by a dedicated hardware cache controller 26 that is part of the peripheral controller. The cache memory 25 is also dedicated to cache operation and is physically separated from the system memory 11. The basic operation of the FIG. 2 cache arrangement is as follows:

a) Read access:
 The operating system 18 sends a request to the peripheral controller 17 indicating that it wishes to read one block of data. The cache controller 26 check if the block is in the cache memory 25:

if no, (read miss) the request data block is transferred from the mass storage peripheral 16 to the cache memory 25 and to the system memory 11 if yes, (read hit) the cache controller 26 transmits the data block from cache memory 25 to the system memory 11.

b) Write access:

The operating system 18 sends a request to the peripheral controller 17 indicating that it wishes to write one block of data. The cache controller 26 check if the block is in the cache memory 25:

if no, (write miss) the data block is transmitted to the peripheral 16 from the system memory 11.

if yes (write hit) the data block in the cache memory is updated from system memory 11.

Thus, in all cases, the data flow goes through the peripheral bus and even if this bus has a high bandwidth (like the PCI bus) it may become a bottleneck because it is often shared with other peripherals (for example, a typical system has VIDEO, IDE, SCSI and LAN interfaces on the same bus).

Advantages of the FIG. 2 cache arrangement are that there is no system software overhead (the cache management is performed by a dedicated hardware); high cache efficiency (unlike the FIG. 1 arrangement, the cache organisation is not limited); and there is no need for drivers, making the arrangement operating system independent. Disadvantages include the fact that the cache size is not flexible, the cost is high (dedicated DRAM and DRAM controller), and all cache transfers use the peripheral bus which may be an issue for the other devices that share the same bus.

It is an object of the present invention to provide an external cache arrangement which minimises the disadvantages of the prior art systems and provide a reasonable compromise between low cost, efficiency and flexibility.

SUMMARY OF THE INVENTION

According to the present invention, there is provided a computer having a processor, a mass storage subsystem (generally a mass storage peripheral and peripheral controller) for storing data blocks, system memory a portion of which is organized as cache memory with addressable locations for temporarily storing selected ones of said data blocks, a cache manager, and a bus system comprising a local bus to which the processor is connected, a memory bus to which the system memory is connected, a peripheral bus to which the cache manager and mass storage subsystem are connected, and an inter-bus interface inter-connecting the local, memory and peripheral buses; the processor being operative to run a program for asking the cache manager by a request transmitted over the bus system whether a particular data block is currently in the cache memory, and the cache manager comprising:

association means associating addressable locations of the cache memory, as identified by respective identifiers, with any selected data blocks currently stored therein, check means responsive to a request to check the association means to find whether said particular data block is currently in the cache memory, and report means operative upon the check means finding that said particular data block is in the cache memory, to return an in-cache indication over the bus system to the program.

By virtue of this arrangement, the system memory can be used for cache memory enabling the cache size to be flexible; at the same time, cache efficiency is good and the processor is not burdened with many of the cache management tasks.

The cache manager is preferably connected to the peripheral bus, either through its own bus interface or through the same interface as the mass storage subsystem.

If the cache is operated with a direct-mapped organisation in which any given data block may be stored in one predetermined cache location, then the program can be arranged to determine for itself this location. For other cache organisations where a data block can be stored in any one of two or more possible cache locations, the report means is generally further operative, upon the check means finding that said particular data block is in the cache memory, to return to the program an identifier of the cache location where said particular data block is currently stored.

Furthermore, in one embodiment, upon the check means finding, in response to a request for a particular data block required for reading, that this particular data block is not in the cache memory, the report means is operative to return to the program a not-in-cache indication together with an identifier of the cache location to be used for storing said particular data block. The program, on receiving this not-in-cache indication and identifier from the report means, then causes the particular data block concerned to be transferred from the mass storage subsystem to the cache location indicated by the identifier.

In another embodiment, the mass storage subsystem includes block-transfer control means for controlling data block transfers over the bus system, and the cache manager and mass storage subsystem are directly operatively interconnected and share a common interface to said bus system. In this case, upon the check means finding, in response to a request for a particular data block required for reading, that this particular data block is not in the cache memory, the cache manager is arranged to instruct directly the block-transfer means of the mass storage subsystem to transfer the particular data block to a predetermined cache location; the report means then returns to the program the identifier corresponding to that predetermined cache location.

BRIEF DESCRIPTION OF THE DRAWINGS

A computer cache system embodying the invention will now be described, by way of non-limiting example, with reference to the accompanying diagrammatic drawings, in which.

BEST MODE OF CARRYING OUT THE INVENTION

Figure 1:
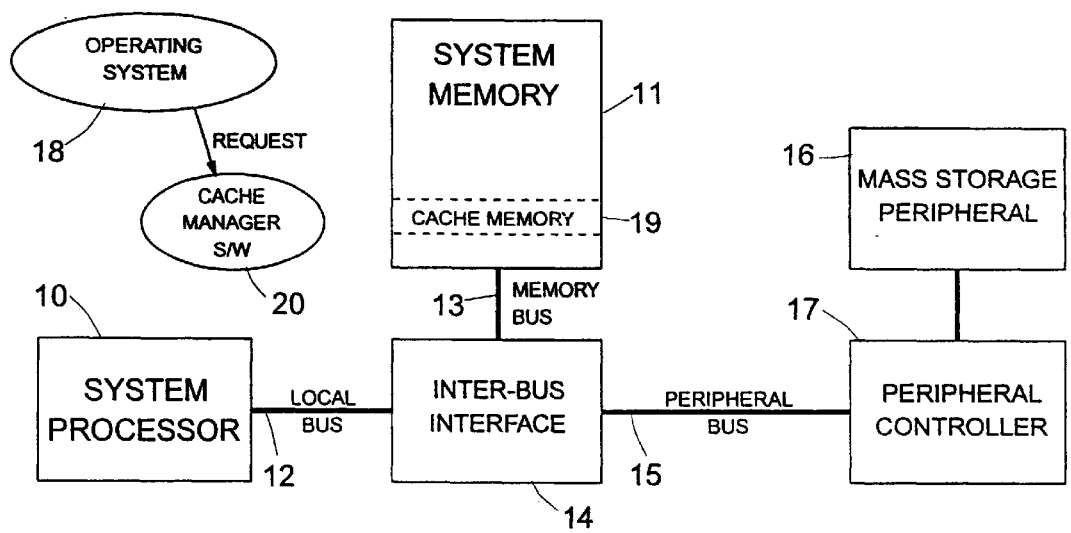
FIG. 1 is a block diagram of a first prior art computer cache system.
Figure 2:
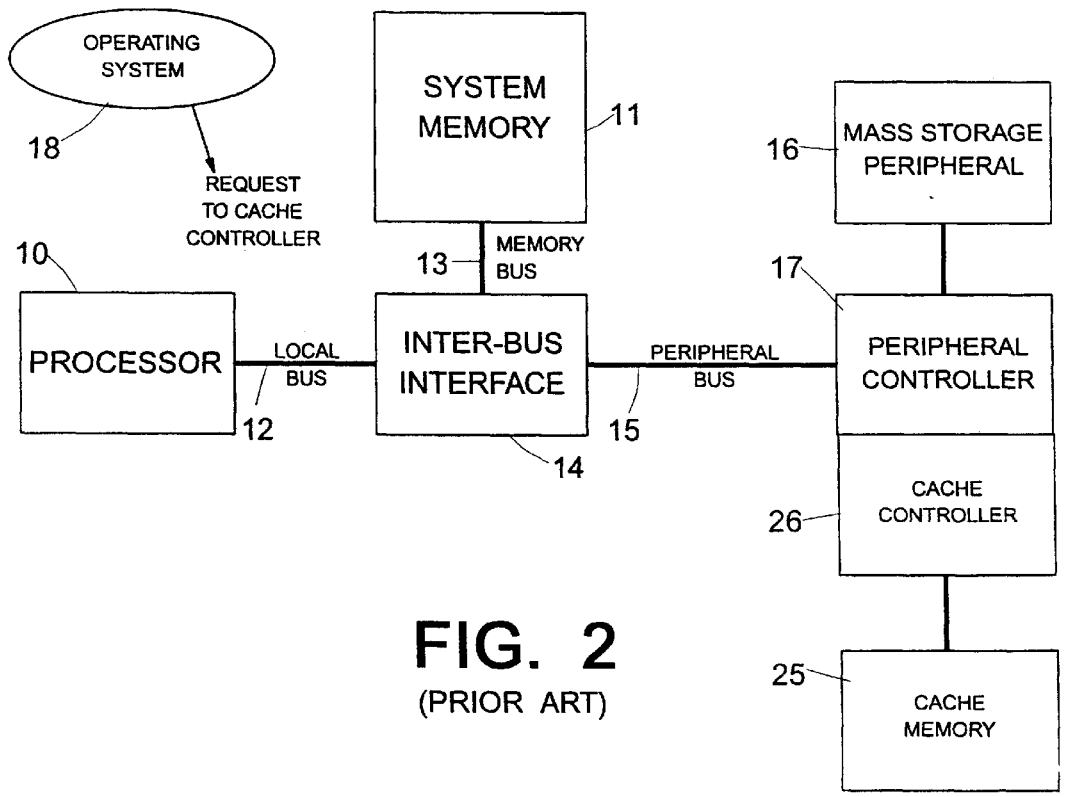
FIG. 2 is a block diagram of a second prior art computer cache system.
Figure 3:
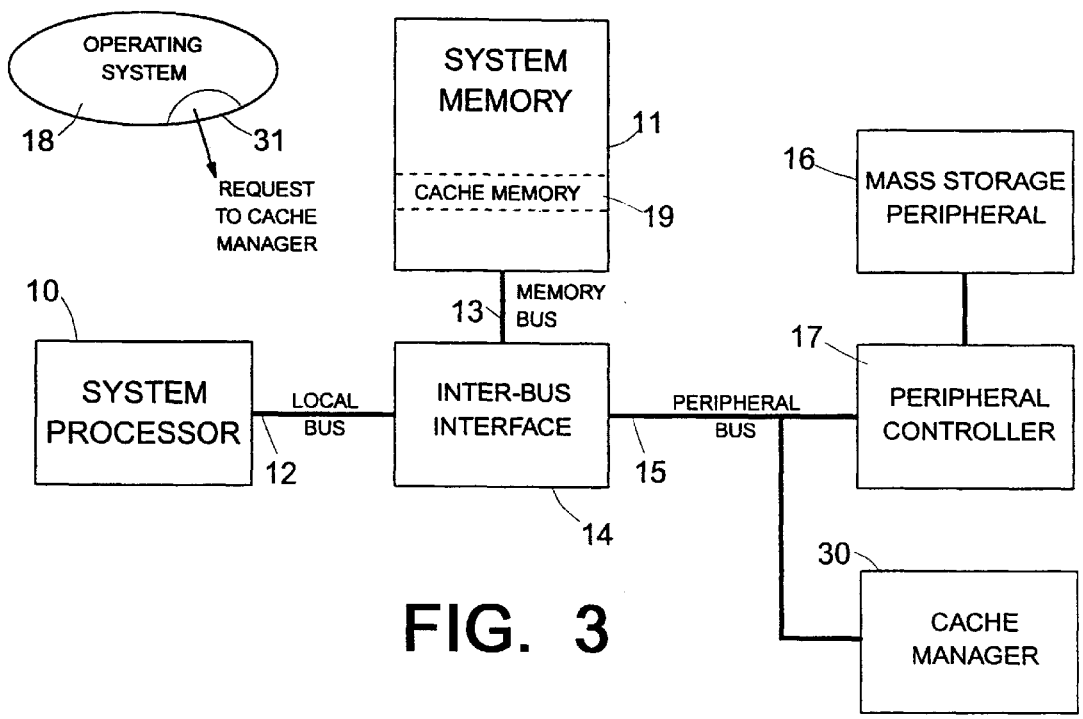
FIG. 3 is a block diagram of the computer cache system embodying the present invention.

The general arrangement of the cache architecture embodying the present invention is shown in FIG. 3 in respect of a computer system similar to that shown in FIGS. 1 and 2. The FIG. 3 computer system thus comprises a system processor 10, system memory 11, a mass storage subsystem constituted by a mass storage peripheral device 16 controlled by a controller 17, and a bus system made up of a processor local bus 12, a memory bus 13, a peripheral bus 15 (such as a PCI bus) and an inter-bus interface 14. The processor 10 runs its operating system 18 from the system memory 11.

A processor-external cache arrangement is provided in the form of a portion 19 of system memory 11 configured as cache memory, dedicated cache manager circuitry 30 connected to the bus system through an interface different to that connecting the processor or system memory to the bus system, and an operating-system specific driver 31. The cache manager 30 is preferably either connected to the peripheral bus through its own interface (as shown in FIG. 3) or is integrated with the peripheral controller 17 and interfaces with the peripheral bus through the interface as the controller 17; cache manager 30 may, alternatively, be connected to a different bus.

The basic operation of the FIG. 3 cache arrangement is as follows:

a) Read access:

The operating system 18 requests (through driver 31) read access to a particular data block. This request is always sent to the cache manager 30 which checks an internal look-up table to see if the block is in the cache memory 19:

if no, (read miss) the requested data block is transferred from the mass storage peripheral 16 to the cache memory 19 (either under the control of the operating system or peripheral controller) from where the operating system copies it to where it is required.

if yes, (read hit) the cache manager reports where the data block is stored in cache memory and the operating system copies it to where it is required.

b) Write access:

The operating system 18 requests (through driver 31) write access to a particular data block. The request is always sent to the cache manager 30 which checks if the block is in the cache memory 11 using its internal look-up table.

if no, (write miss) the data block is transmitted to the mass storage peripheral from the system memory either under the control of the operating system or the peripheral controller 17.

if yes, (write hit) the cache manager 30 reports where the data block is in cache memory and the operating system updates the block in cache memory.

Thus, in the case of a cache hit, the data flow will be from one part of system memory to another, this transfer being done by the processor 10. In the case of a cache miss, the data flow is over the peripheral bus and is done either by the processor (under operating system control) or by the peripheral controller (where the latter is DMA, or MASTER, capable).

Figure 4:
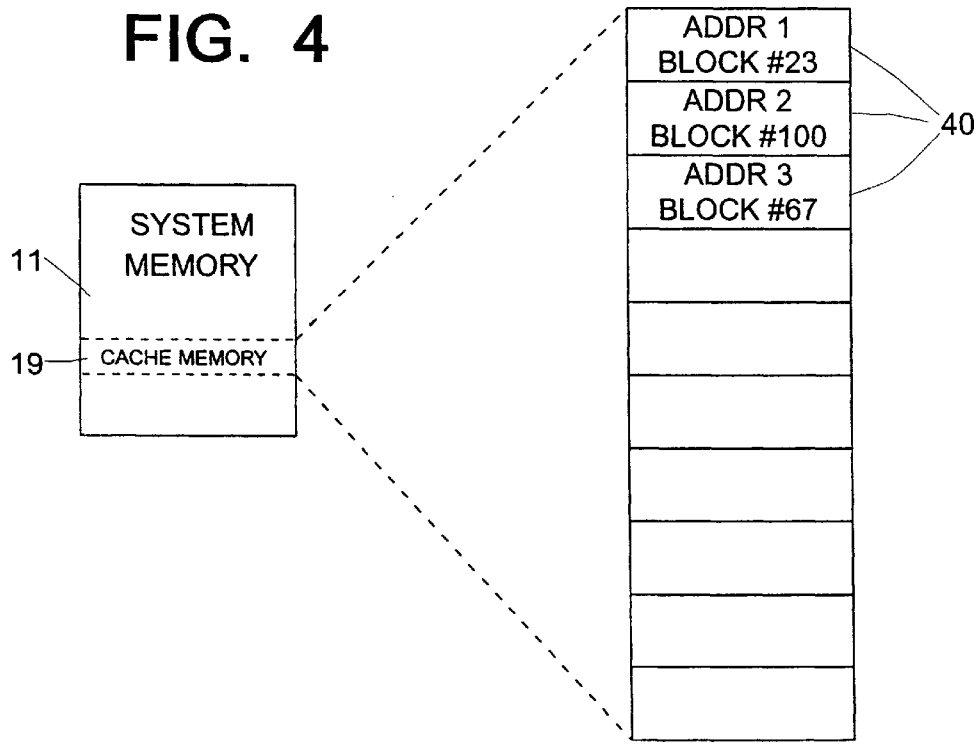
FIG. 4 is a diagram illustrating the allocation of data blocks to cache memory locations in the FIG. 3 computer cache system.

A more detailed description of the FIG. 3 cache arrangement will now be given with reference to FIGS. 4 to 6.

The mass storage peripheral 16 contains M data blocks where, for example, one block is 1024 bytes and M is 1024K. The cache memory 19 is sized to hold up to N blocks where N is 4K. Each block of the M blocks in the mass storage peripheral 16 has a unique id number and FIG. 4 illustrates by reference to such numbers how the first three address locations 40 (numbered '1', '2' and '3'), in the cache memory area 19 of the system memory 11 may be occupied. Thus, cache address '1' holds block '23', address '2' holds block '100', and address '3' holds block 67.

In the present embodiment, the cache organisation is "full associative" by which is meant that any data block from the mass storage peripheral can be stored in any cache location.

Figure 5:
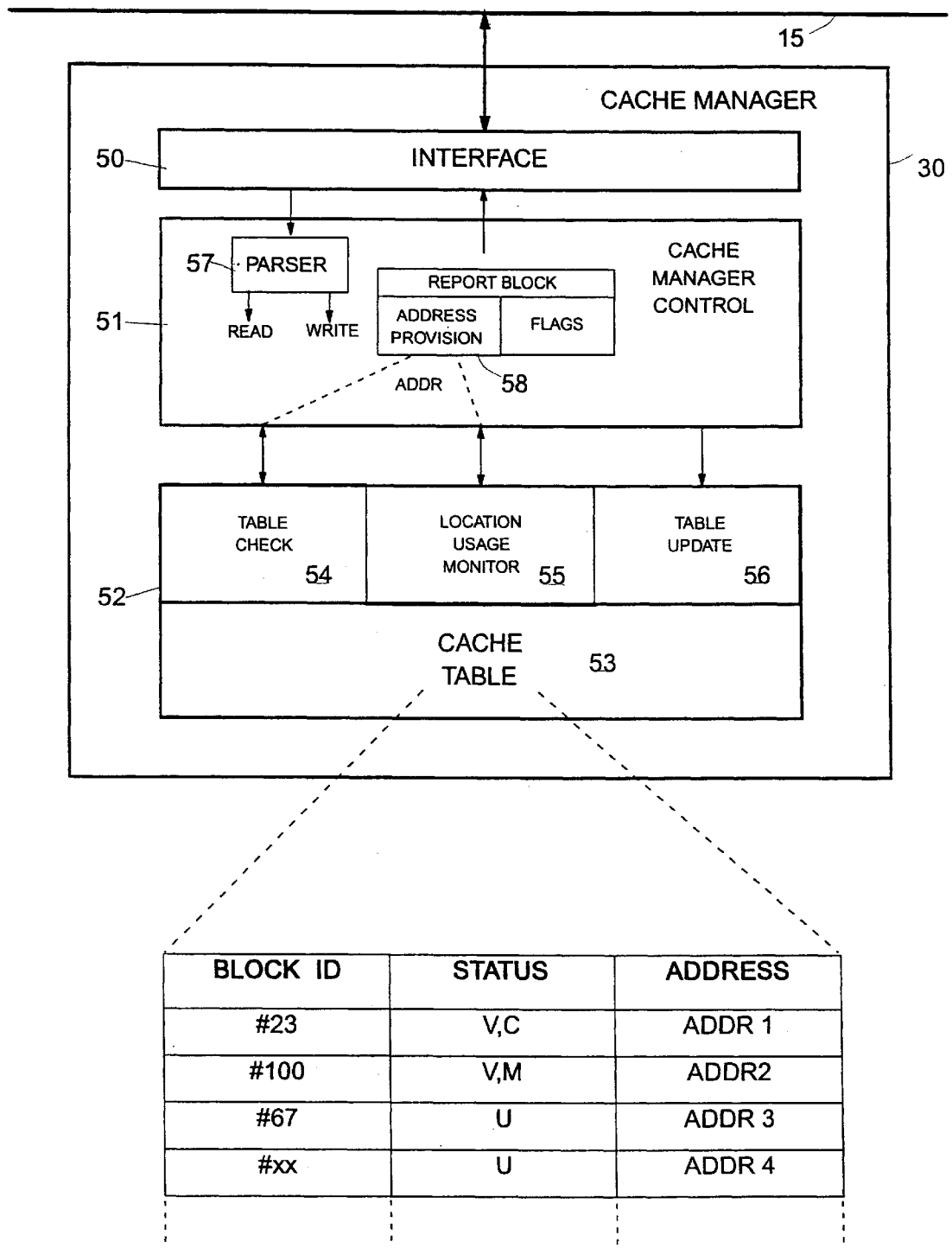
FIG. 5 is a functional block diagram of a cache manager of the FIG. 3 system.

FIG. 5 shows the main functional blocks of the cache manager circuitry 30. More particularly, the cache manager 30 comprises a bus interface 50 interfacing the cache manager 30 with the peripheral bus 15, a cache manager controller 51, and a cache table sub-system 52.

The heart of the cache manager is a cache table 53 that forms part of the sub-system 52 and is shown in detail in the lower part of FIG. 5. The table 53 contains an entry for each addressable location of the cache memory as identified by its address. Each entry, as well as containing the location address, also contains the id number of the data block last held in that address and status flags indicating the current status of the block as follows:

V=the block in cache is valid;

U=the block in cache is invalid;

C=the block in cache is consistent with the corresponding block in the mass storage peripheral;

M=the block in cache has been modified relative to the corresponding block in the mass storage peripheral.

The status flags C and M are required where, as in the present embodiment, data block writing is effected on the basis that if the block is in cache, then only the copy of the block in cache is modified at the time the operating system effects a block write; this gives rise to an inconsistency between the block as stored in cache and as stored in the mass storage peripheral 16 until such time as the block is written back from cache to the peripheral. This manner of write operation is known as 'write back'. The alternative arrangement of effecting writes both to the cache and to the mass storage peripheral whenever an operating-system block write is effected is known as "write through" operation; this mode of operation, whilst ensuring consistency between the cache and mass storage peripheral, does not speed up system performance during writing (though, of course, the updated block will be ready for reading in cache).

The example entries in the cache table 53 of FIG. 5 are interpreted as follows:

Address '1' Entry—address location '1' holds block '23' which is valid and consistent with peripheral 16.

Address '2' Entry—address location '2' holds block 100 which is valid but modified relative to the peripheral 16.

Address '3' Entry—address location '3' holds block 67 which is invalid

In addition to the cache table 53 itself, the cache table sub-system 52 also comprises a table check block 54 for checking the table in response to a read/write request, to ascertain whether a particular data block is in the cache and if so whether it is valid and its location; a table update block 56 for effecting changes to the cache table 53; and a cache location usage monitor 55. This monitor 55 serves to provide the next cache address for use when the cache manager controller determines that a new block is to be inserted in the cache. The monitor 55 will first try to find an address location containing an invalid block but, failing this, will provide the address of the cache location containing the block not accessed for the longest period of time (it will be appreciated that other location re-use policies are equally possible). To facilitate operation of the monitor 55, each entry in the table may include a further field for a time-of-last use timestamp.

As regards the cache manager controller 51, its functionality will be best understood from the description of the operation of the cache manager to be given hereinafter with reference to the FIG. 6 flow chart. However, the following functional blocks can be noted, namely a parser block 57 for determining whether an incoming request is for a read or a write operation; and a report block 58 for returning to the operating system the result of a request in terms of flags and, as appropriate, a cache address.

Figure 6:
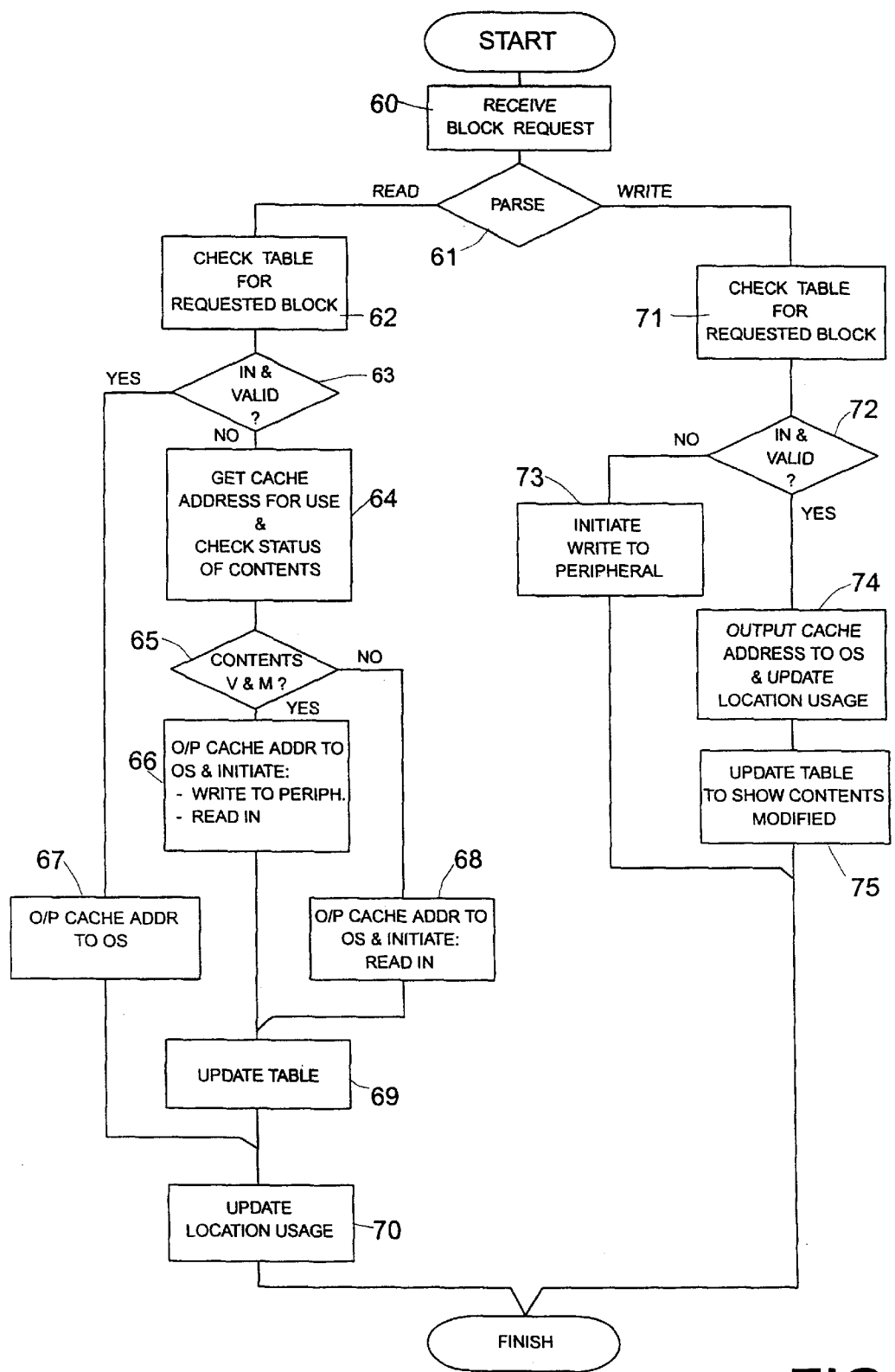
FIG. 6 is a flow chart illustrating the operation of the FIG. 5 cache manager.

Turning now to the FIG. 6 flow chart, upon the cache manager receiving a block request from the operating system 18 (step 60), the parser 57 determines whether it is a read or a write request (step 61). If it is a read request, the controller 51 causes the table check block 54 to check whether the requested block is in cache by referring to the table 53 (steps 62 and 63). If the cache table has a valid entry for the block, then it so indicates to the controller 51 and passes it the relevant cache address which the report block 58 outputs to the operating system (step 67) together with an in-cache flag; at the same time, the controller 51 updates the location monitor 55 with the fact that the requested block has just been used. The operating system on receiving the cache address, reads the requested block from cache.

If the table check in step 63 indicates that the requested block is not in cache (or not valid), then the controller 51 asks the monitor 55 to provide a cache address that can be used for storing the block (step 64). If the monitor 55 finds an invalid block from its check of the table 53, then it will pass the corresponding address to the report block 58 (steps 65, 68) and the address will be returned to the operating system. At same time, the report block 58 also returns a not-in-cache flag to the operating system indicating that the requested block needs to be read from the mass storage peripheral 16. The operating system (driver 31) will then either transfer the block itself to the cache address passed to it or, if the peripheral controller is DMA (MASTER) capable, will instruct the peripheral controller to carry out this task. The operating system then reads the block from cache. Meanwhile, the cache manager controller 51 causes the table update block 56 to update the cache table with the new block id and status flags of 'V, C' (step 69); in addition, the location usage monitor is caused to record a usage of the new block (step 70).

If at step 65, the location usage monitor could not find an invalid block, it chooses the cache location with the block that has been there longest without usage. If the status flags associated with this block show that it has not been modified (so that it is consistent with the corresponding block in the peripheral 16), then processing proceeds as described above for the case of an invalid block entry (steps 68, 69, 70). However, if the status flags indicate that the block has been modified, it must be written back to the peripheral 16 before the corresponding cache location can be reused. Therefore, on the cache manager controller 51 being informed by the usage monitor of the new address to use and of the fact that it currently contains a valid, modified block, the report block 58 outputs that address to the operating system together with both a not-in-cache flag and a write-back flag. These flags indicate that not only must the requested block be transferred from the peripheral to the given cache location, but also this operation must be preceded by write back of the existing contents of the given cache address to the peripheral (step 66). The operating system (driver 31) is then responsible or effecting the required transfers either by controlling them itself or by using any DMA (MASTER) capability of the peripheral controller 17. Meanwhile, the cache manager controller 51 causes the table 53 and the location usage monitor to be appropriately updated.

Where the parser 57 determines the original request to be a write request, then processing proceeds according to the right-hand side of FIG. 6. Thus, again the table 53 is first checked to ascertain if the requested block is in the cache and valid (step 71). If the block is not present or is invalid (step 72) then the report block 58 returns a not-in-cache flag indicating that the block must be written directly to the mass storage peripheral (step 73); the operating system then either controls this writing itself or causes the peripheral controller 17 to effect the transfer where the latter is DMA (MASTER) capable.

If at step 72 the requested block is found to be in the cache memory and valid, then the report block 58 returns the corresponding cache address and an in-cache flag to the operating system (step 74) which then updates this block in cache without writing to the peripheral. The cache manager controller 51 updates the cache table to show that the block has been modified (step 75).

By way of example, if there is a read request for block '23' there will be a cache hit at address '1'; this address will be returned and the status of the block will be unchanged. If there is a write request for the same block, again the address will be returned but now the status of the block will be changed to 'V, M' to show that the block has been modified.

Variants

Many variants are possible to the FIG. 3 cache arrangement. For example, the cache manager could be arranged to operate in 'write through' mode which, as explained above, always involves a block subject of a write request being written back to the peripheral 16. Again, the cache manager could operate on an 'allocation on write' principal in which on a write miss occuring, the block concerned is not only written to the peripheral but also to a newly-allocated location in cache; "allocation-on-write" would normally be effected additionally to, rather than as alternatively to, "allocation-on-read" (it being appreciated that the FIG. 3 embodiment employs "allocation on read").

Another possibility would be to operate a 'read ahead' feature by which whenever a read miss occured, not only the block concerned is moved into the cache but also the following adjacent block or blocks.

As already noted, the cache manager 30 could be part of the peripheral controller 17, interfacing with the bus 15 through the same interface as the latter. In this case, where the controller 17 is DMA (MASTER) capable, then the cache manager can directly instruct the controller 17 to effect block transfers to and from the cache memory when this is required.

In another arrangement the inter-bus interface 14 could be provided with a DMA (MASTER) capability to relieve the processor 10 of the task of effecting transfers (in either direction) between the cache memory 19 and the mass storage peripheral 16, and between the cache memory 19 and other parts of the system memory 11.

In the described embodiment, a full associative cache organisation has been assumed. Other organisations are also possible; for example, a direct-mapped organisation may be used in which a data block of the mass storage peripheral can only be transferred to one particular cache location (there being a many to one mapping between each cache location and data blocks of the peripheral). With such an organisation, the cache manager need not return an address to the operating system driver as the latter can be set to know where in cache a desired block is to be found; the cache manager will, of course, still need to indicate if the desired block is valid and in the cache memory. Between the extremes of a full associative cache organisation and a direct-mapped cache organisation, are other possible organisations such as a two way associative cache where a data block can be put in either of two predetermined cache locations; in such a case, again the cache manager need not return a full cache address to the operating system but simply an indication of whether is block is present in cache and, if so, in which of the two possible locations it resides.

As regards the detailed implementation of the cache manager 30, persons skilled in the art will appreciate that this can be done in a number of ways including by a fully dedicated hardware solution or ASIC design; it would also be possible to use a microcontroller approach. Although the association between cache address and block id has been described as being provided by a look-up table (typically held in RAM) any other appropriate data structure can be used. Furthermore, each cache location need not be identified by its address but some other identifier could be used provided it was possible to derive the cache location address from this identifier (either by manipulation or some look-up arrangement).

What is claimed is:

1. A computer having:

a processor, a mass storage subsystem for storing data blocks, system memory a portion of which is organized as cache memory with addressable locations for temporarily storing selected ones of said data blocks, hardware-configured cache manager, and a bus system comprising a local bus to which said processor is connected, a memory bus to which said system memory is connected, a peripheral bus to which said cache manager and mass storage subsystem are connected, and an inter-bus interface inter-connecting said local, memory and peripheral buses, said cache manager and said mass storage subsystem connected so as to use said peripheral bus as a common data path;

the processor being operative to run a program for asking the cache manager by a request transmitted over said bus system whether a particular data block is currently in the cache memory, and the cache manager comprising:

association means associating addressable locations of the cache memory, as identified by respective identifiers, with any said selected data blocks currently stored therein, check means responsive to a said request to check said association means to find whether said particular data block is currently in said cache memory, and report means operative upon said check means finding that said particular data block is in the cache memory, to return an in-cache indication over said bus system to said program;

said program responding to said in-cache indication to control said processor to access said particular data block via a path consisting of said local bus, said inter-bus interface and said memory bus.

2. A computer according to claim 1, wherein said cache manager and mass storage subsystem share the same interface to said peripheral bus.

3. A computer according to claim 1, wherein said cache manager and mass storage subsystem have respective interfaces to said peripheral bus.

4. A computer according to claim 1, wherein said report means if further operative upon said check means finding that said particular data block is in the cache memory, to return to said program an identifier of the cache location where said particular data block is currently stored.

5. A computer according to claim 1, wherein upon said check means finding, in response to a said request for a said particular data block required for reading, that said particular data block is not in the cache memory, said report means is operative to return to said program a not-in-cache indication together with an identifier of a said cache location to be used for storing said particular data block; said program, on receiving said not-in-cache indication and said identifier from the report means, causing said particular data block to be transferred from the mass storage subsystem to the cache location indicated by said identifier.

6. A computer according to claim 1, wherein said mass storage subsystem includes block-transfer control means for controlling data block transfers over said bus system, and wherein said cache manager and mass storage subsystem are directly operatively interconnected and share a common interface to said bus system; said cache manager including transfer-initiation means operative upon said check means finding, in response to a said request for a said particular data block required for reading, that said particular data block is not in the cache memory, to instruct directly said block-transfer means of the mass storage subsystem to transfer said particular data block to a predetermined cache location specified by said transfer-initiation means; and said report means being further operative to return to said program the said identifier corresponding to said predetermined cache location.

* * * * *